June 17, 1924.

J. A. LECLAIR 1,498,103

MACHINE FOR CLOSING CHANNEL LIPS OF SHOES

Filed Feb. 15, 1923   2 Sheets-Sheet 1

Joseph A. Leclair  INVENTOR.

BY

Gardner W. Pearson

ATTORNEY.

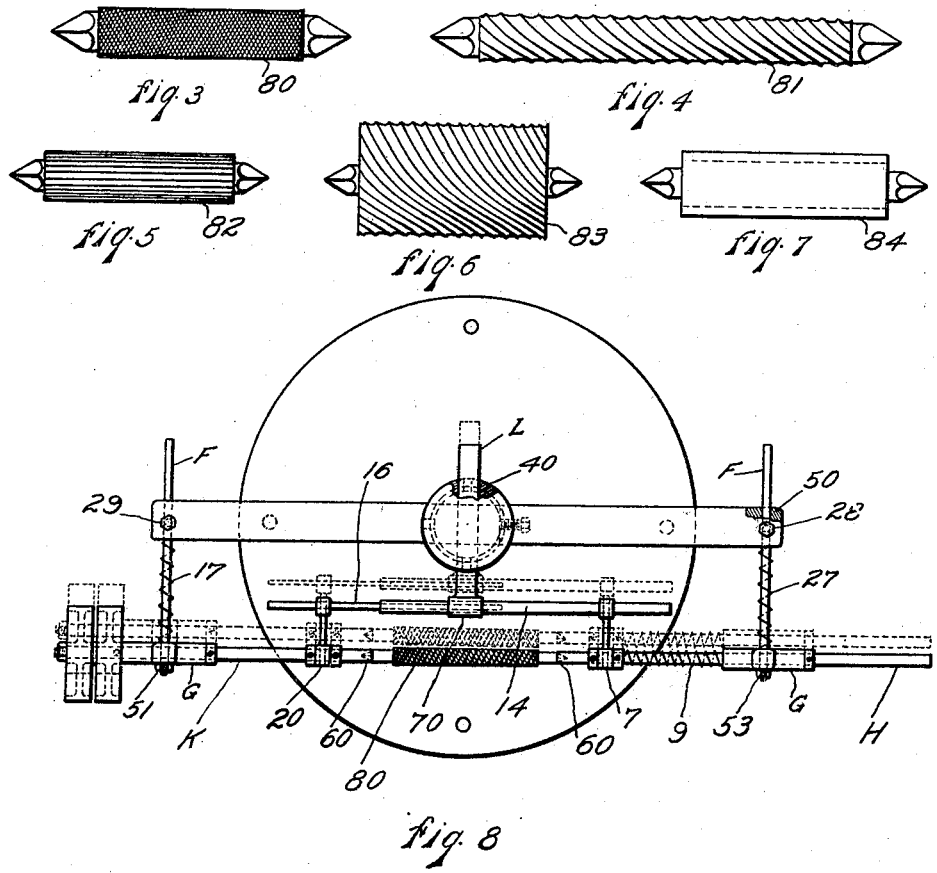

Patented June 17, 1924.

1,498,103

UNITED STATES PATENT OFFICE.

JOSEPH A. LECLAIR, OF LOWELL, MASSACHUSETTS.

MACHINE FOR CLOSING CHANNEL LIPS OF SHOES.

Application filed February 15, 1923. Serial No. 619,202.

*To all whom it may concern:*

Be it known that I, JOSEPH A. LECLAIR, a citizen of the United States, residing at Lowell, in the county of Middlesex and State of Massachusetts, have invented certain new and useful Improvements in a Machine for Closing Channel Lips of Shoes, of which the following is a specification.

This invention relates to processes and machines used in making shoes.

In making what is known as a McKay shoe, a channel is cut in the sole the lip of which is turned back, and in this channel thread is buried in stitching the sole to the upper. Cement is then placed in the channel, the sole is moistened with water, and as now done, the lip is turned down into the channel by a hand tool after which the shoe is passed through what is known as a beating-out or leveling machine by which the sole is finished and the lip smoothed out in the channel where it is held by the cement.

After the stitching and before turning down the lip by hand, it is necessary that the shoe should be placed on a last or form which is held in any suitable support so that the operator can grasp a tool with both hands to work on the lip. The shoe is generally placed on the form or metal last of the leveling machine and there worked on. When this is done, there is danger of injury to the operator's hands.

The tool generally used is a half-round file held between the hands and worked so that the edge will come in contact with the lip.

By my process, I use a revolving member, preferably of cylindrical form and roughened on the outside so that it will catch the leather, against which a shoe is pressed by hand. With my process, instead of having the shoe held rigidly and operating on it by hand, I hold the shoe in the hands and bring it with a smoothing motion against a revolving tool which, preferably, is also so held that it yields to pressure.

The shoe is carried against this tool with a circular motion and the tool revolves against the movement of the shoe.

The lip on any shoe may be turned down by my machine and by my process.

In the drawings, Figure 1 is a perspective showing a lip being turned down by my process.

Fig. 3 is an elevation of a short tool knurled on the outside.

Fig. 4 is an elevation of a long spirally cut tool.

Fig. 5 is an elevation of a tool with corrugated cuttings.

Fig. 6 is an elevation of a tool with spiral cuttings and of much larger size than Fig. 4.

Fig. 7 is an elevation of a tool having a rubber surface.

Fig. 8 is a plan view of my preferred form of machine with a tool held therein.

Figure 1:
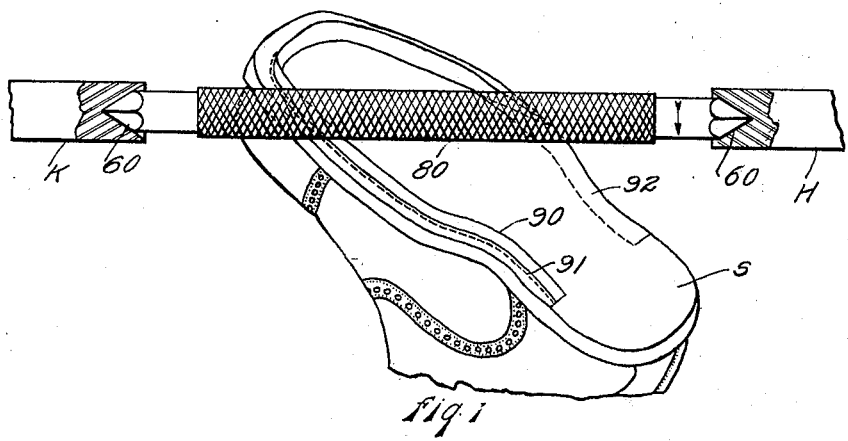

In the drawings, B represents the floor and A the stand having a base 1 which may be attached to the floor by means of screws 4. This base is of tubular form, as shown at 2, open at the top.

C represents a head having a shank which extends down therefrom inside stand A, the lower part 42 being flattened so that it can be engaged by a set screw 3 to prevent turning, and the upper part 41 being threaded for a collar 43.

This collar 43 rests on the top of stand A. When it is wished to raise or lower head C, 43 is turned up or down by inserting a rod in a hole 45.

D represents a cross-bar shown as of rectangular cross section carried by and extending through head C. At each end of bar D is a guide arm bearing 50 shown as a hole through the arm at right angles to bar D. In each of these bearings is slidable a guide arm F adjustable by means of set screws 28 and 29.

These guide arms extend forward in a parallel direction and on each is slidable a holder bearing G. Between each holder bearing and the cross-bar is a holder spring 17 or 27 whereby if a holder bearing is forced back the spring will return it. The forward movement of each is limited by a stop 51 or 53.

Each holder bearing has a tool support passage parallel with the cross-bar and alined with each other, and in each passage is a tool support H or K axially movable and slidably revoluble therein. Each has an end recess 60 of triangular or any other non-circular form adapted to hold the end of a round tool.

Tool support H, besides being revoluble in the bearing passage in holder bearing G, is also revoluble in intermediate bearing 7. It has suitable adjustable stops in the form of collars 11, 6 and 8. Stop 11 limits its movement towards holder K, and stops 6 and 8 position it with reference to intermediate bearing 7.

Holder K has a collar stop 22 next bearing G, and at its outer end the fast and loose pulleys 24 and 25 by which it is revolved, said pulleys being shown as held in place by a nut 26.

It also has the collar stops 21 and 19 fixed on each side of an intermediate bearing 20.

Through a suitable passage 40 in head C passes a slide rod L at right angles to cross-bar D carrying at its front an intermediate supporting head 70 through which, parallel with cross-bar D, is a passage in which is slidable a telescope tube 14 to which is fixed intermediate bearing 7.

A telescope rod 16 is slidable in tube 14 and to this is fixed intermediate bearing 20.

Figure 2:
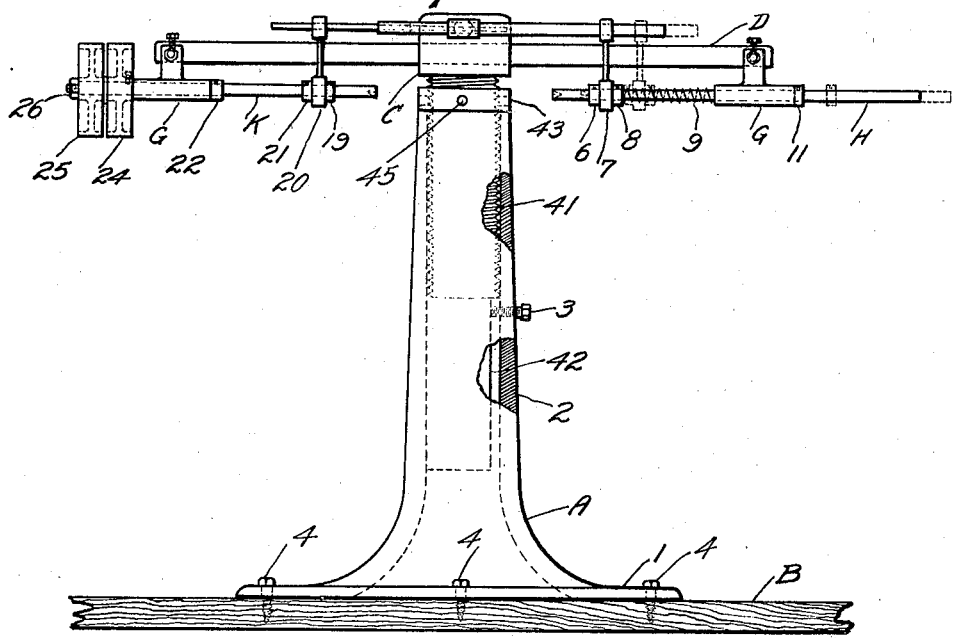
Fig. 2 is an elevation from the front of my preferred type of machine for operating my tool.

9 represents a tool holding spring between collar 8 and bearing G which tends to keep holder H, intermediate bearing 7, and telescope tube 14 forced inward towards holder K whereby a tool, such as 80, can readily be inserted between the end recesses or jaws 60. This is shown by the dotted lines in Fig. 2.

It is clear that when the tool is inserted and pressure is applied through the shoe against the tool, the holders K and H, holder bearings G and G, slide rod L and the attached parts, will give back yieldingly, as shown by the dotted lines in Fig. 8.

While I prefer this yielding action, it is obvious that by loosening set screws 28 and 29 the parts may be forced back until the supporting head 70 strikes the head C, which will limit the movement and cause the whole device to be rigid. It is equally obvious that as this makes a rigid device, I might use any rigid construction between the cross-bar D and the bearings for the revolving holders.

I may use any kind of a cylindrical tool, preferably, roughened on the outside so as to catch and pull the leather. At 80 I show a short knurled tool, at 81 a long curved cut tool, at 82 a longitudinally cut or scored tool, at 83 a spirally cut tool of much larger diameter, and at 84 a tool covered with rubber.

Each tool has at each end a stud of non-cylindrical form as a means by which it can be held in the jaws 60, 60 of revoluble holders H and K.

I claim:

1. In a machine for turning down the lip of a channel in a shoe, the combination with a stand, of a head vertically adjustable thereon, a cross bar carried by the head, a guide arm bearing carried at each end of the cross bar, guide arms adjustably carried one at each end of the cross bar, a holder bearing slidable on each guide arm, a holder spring between each holder bearing and the cross bar, said holder bearings each having a tool support passage parallel with the cross bar and alined with each other, a tool support axially slidable and revoluble in each tool support passage each having an end recess to hold the end of a round friction tool and each revoluble in an intermediate bearing, adjustable stops to position the tool holders in alined relation to each other, a tool holding spring for one tool holder, driving means for the other tool holder, a slide rod slidable through the head at right angles to the cross bar, an intermediate supporting head carried thereby, a telescope tube slidable therethrough, a telescope rod slidable in said tube, and intermediate bearings for the tool holders carried respectively by the telescope tube and rod.

2. In a machine for turning down the lip of a channel in a shoe, the combination with a stand, of a head thereon, a cross bar carried by the head, guide arms carried one at each end of the cross bar, a holder bearing on each guide arm, said holder bearings each having a tool support passage parallel with the cross bar and alined with each other, a tool support axially slidable and revoluble in each tool support passage each having an end recess to hold the end of a round friction tool and each revoluble in an intermediate bearing, adjustable stops to position the tool holders in alined relation to each other, a tool holding spring for one tool holder, driving means for the other tool holder, a slide rod slidable through the head at right angles to the cross bar, an intermediate supporting head carried thereby, a telescope tube slidable therethrough, a telescope rod slidable in said tube, and intermediate bearings for the tool holders carried respectively by the telescope tube and rod.

3. In a machine for turning down the lip of a channel in a shoe, the combination with a stand, of a head thereon, a cross bar carried by the head, guide arms carried one at each end of the cross bar, a holder bearing on each guide arm, said holder bearings each having a tool support passage parallel with the cross bar and alined with each other, a tool support axially slidable and revoluble in each tool support passage each having an end recess to hold the end of a round friction tool and each revoluble in an intermediate bearing, adjustable stops to position the tool holders in alined relation to each other, a tool holding spring for one tool holder, driving means for the other tool holder, and intermediate bearings for the tool holders carried respectively by the head.

4. In a machine for turning down the lip of a channel in a shoe, the combination with a stand, of a head thereon, a cross bar carried by the head, guide arms carried one at each end of the cross bar, a holder bearing on each guide arm, said holder bearings each having a tool support passage parallel with the cross bar and alined with each other, a tool support revoluble in each tool support passage each having an end recess to hold the end of a round friction tool.

JOSEPH A. LECLAIR.